US010875399B2

(12) United States Patent
Heeke et al.

(10) Patent No.: US 10,875,399 B2
(45) Date of Patent: Dec. 29, 2020

(54) HYBRID MODULE INCLUDING INTEGRATED HYDRAULICS AND CONTROLS

(71) Applicant: Schaeffler Technologies AG & Co. KG, Herzogenaurach (DE)

(72) Inventors: Gregory Heeke, Wooster, OH (US); Markus Steinberger, Macedonia, OH (US); Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 78 days.

(21) Appl. No.: 16/146,458

(22) Filed: Sep. 28, 2018

(65) Prior Publication Data

US 2020/0101830 A1    Apr. 2, 2020

(51) Int. Cl.
| | |
|---|---|
| *B60K 6/387* | (2007.10) |
| *F16D 48/06* | (2006.01) |
| *B60K 6/26* | (2007.10) |
| *B60K 6/36* | (2007.10) |
| *F16D 48/02* | (2006.01) |

(52) U.S. Cl.
CPC ............... *B60K 6/387* (2013.01); *B60K 6/26* (2013.01); *B60K 6/36* (2013.01); *F16D 48/066* (2013.01); *B60K 2006/262* (2013.01); *F16D 2048/0203* (2013.01); *F16D 2048/0245* (2013.01)

(58) Field of Classification Search
CPC .... F16D 25/0638; F16D 48/06–48/066; F16D 2048/0245; B60K 6/387; B60K 6/405; B60K 6/48
See application file for complete search history.

(56) References Cited

U.S. PATENT DOCUMENTS

| 8,585,541 | B2 * | 11/2013 | Mueller | B60K 6/40 180/65.22 |
|---|---|---|---|---|
| 8,622,182 | B2 * | 1/2014 | Iwase | B60K 6/26 180/65.26 |
| 8,836,181 | B2 * | 9/2014 | Iwase | B60K 6/40 310/67 R |
| 8,836,187 | B2 * | 9/2014 | Iwase | B60K 6/26 310/78 |

(Continued)

*Primary Examiner* — Ernesto A Suarez
*Assistant Examiner* — Lillian T Nguyen
(74) *Attorney, Agent, or Firm* — Davidson, Davidson & Kappel, LLC

(57) ABSTRACT

A hybrid module is configured for arrangement in the torque path upstream from a transmission and downstream from an internal combustion engine. The hybrid module includes a housing, an electric motor including a stator non-rotatably fixed to the housing and a rotor rotatable within the stator, a shaft configured for non-rotatably connecting to a crankshaft of an internal combustion engine and a clutch having a clutch output non-rotatably fixed to the rotor. The clutch is configured for being actuated between an engaged orientation for drivingly connecting the shaft to the clutch output and a disengaged orientation for drivingly disconnecting the shaft from the clutch output. The hybrid module also includes an actuator fixed to the housing. The actuator is configured for hydraulically actuating the clutch between the engaged orientation and the disengaged orientation.

15 Claims, 7 Drawing Sheets

(56) References Cited

U.S. PATENT DOCUMENTS

| | | | |
|---|---|---|---|
| 8,997,956 B2 * | 4/2015 | Iwase | B60K 6/26 |
| | | | 192/3.26 |
| 9,140,311 B2 * | 9/2015 | Iwase | F16D 25/0638 |
| 9,446,763 B2 * | 9/2016 | Larkin | B60W 20/40 |
| 9,447,864 B2 * | 9/2016 | Iwase | B60K 6/405 |
| 9,579,965 B2 * | 2/2017 | Frait | B60K 6/48 |
| 9,581,210 B2 * | 2/2017 | Frait | F16H 45/02 |
| 2003/0148843 A1 * | 8/2003 | Bowen | B60K 6/26 |
| | | | 475/5 |
| 2009/0088297 A1 | 4/2009 | Grethel et al. | |
| 2011/0175212 A1 * | 7/2011 | Huang | H01L 23/3107 |
| | | | 257/675 |
| 2013/0062980 A1 * | 3/2013 | Kuwahara | F16D 25/12 |
| | | | 310/78 |
| 2013/0111891 A1 * | 5/2013 | Iwase | F02B 63/042 |
| | | | 60/347 |
| 2013/0193816 A1 * | 8/2013 | Iwase | B60K 6/387 |
| | | | 310/75 R |
| 2014/0262674 A1 * | 9/2014 | Saito | B60K 6/543 |
| | | | 192/70.11 |
| 2018/0062469 A1 | 3/2018 | Satyaseelan et al. | |
| 2018/0194215 A1 * | 7/2018 | Agner | B60K 6/387 |

\* cited by examiner

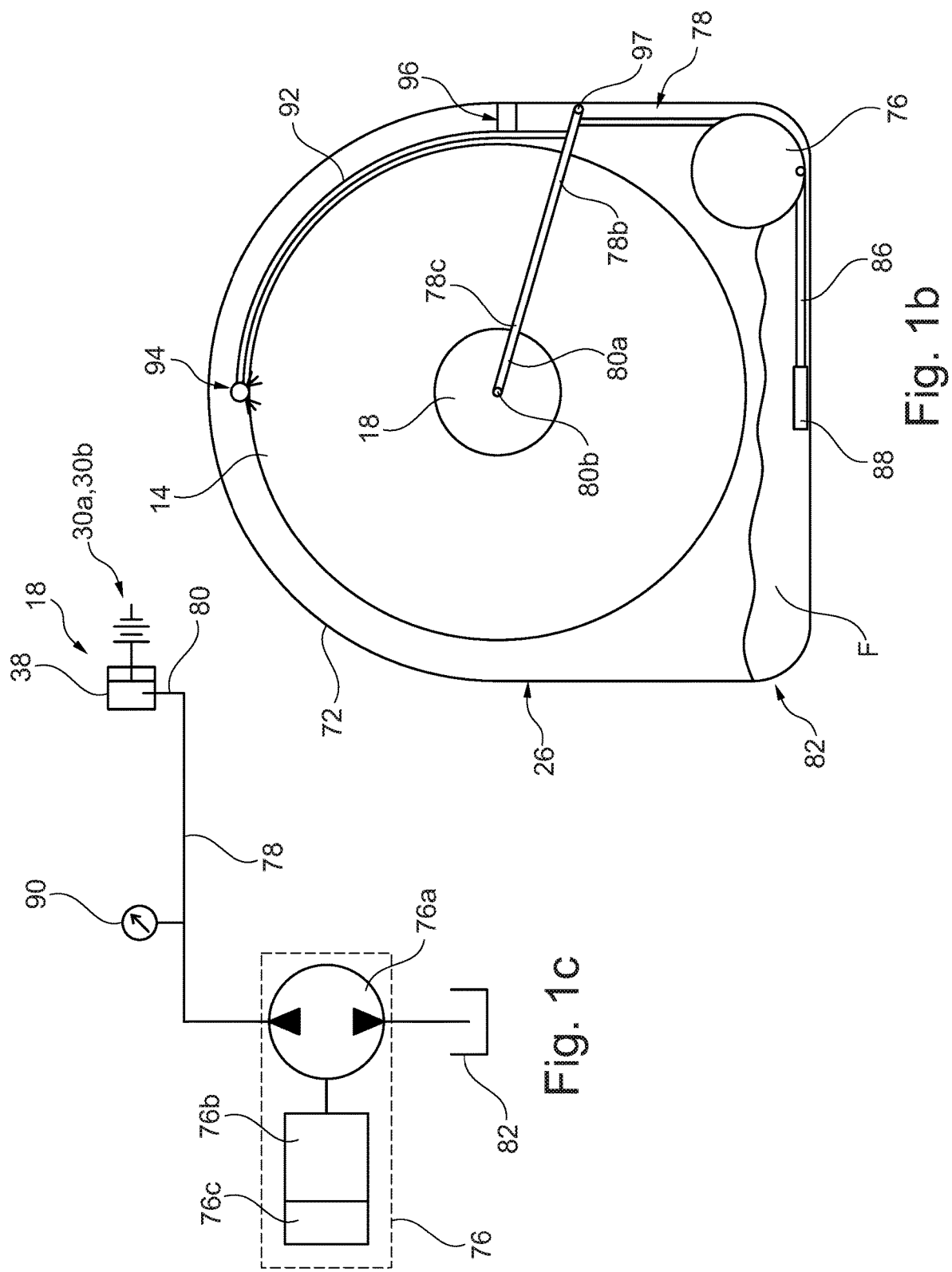

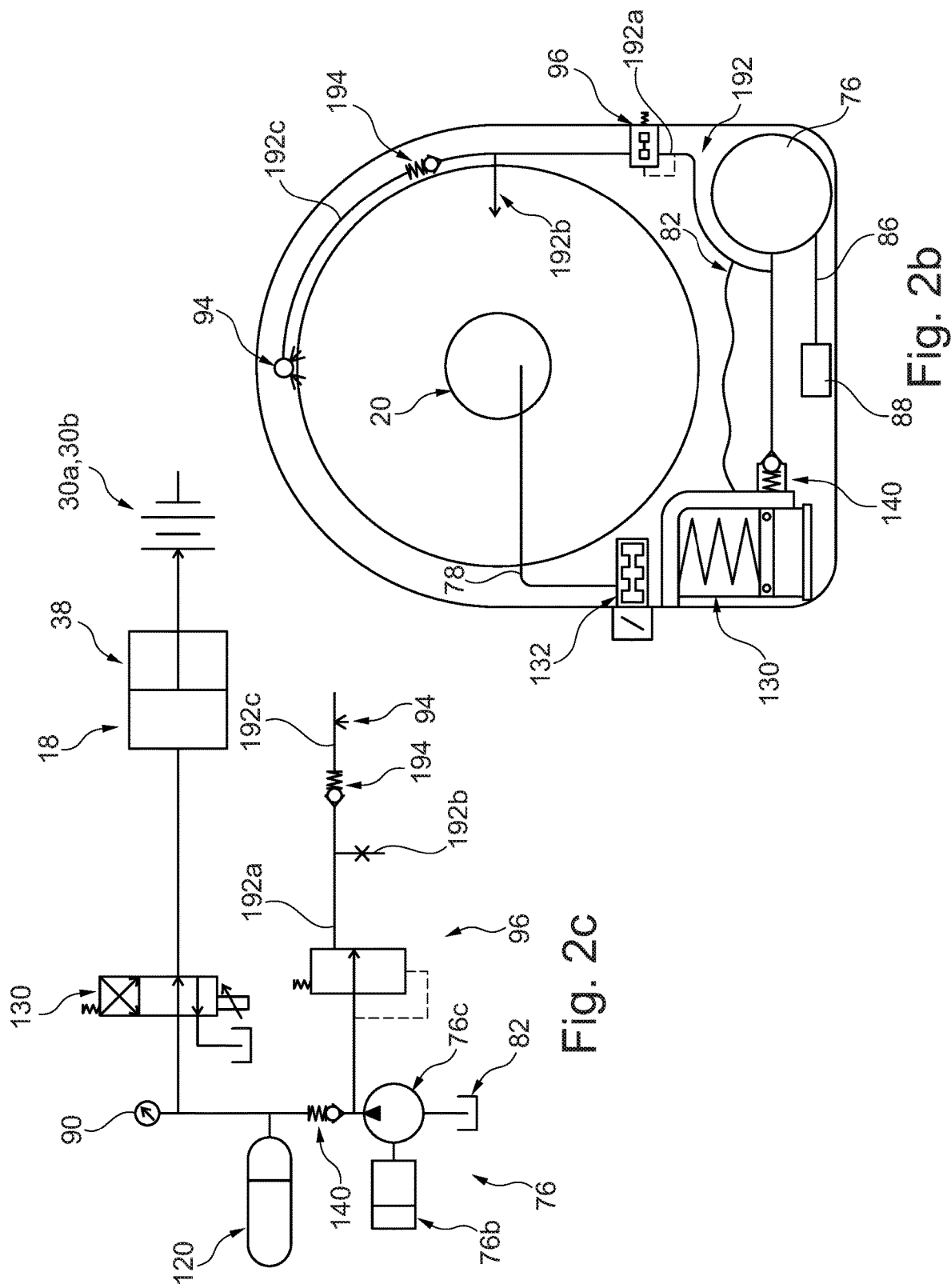

HYBRID MODULE INCLUDING INTEGRATED HYDRAULICS AND CONTROLS

The present disclosure relates generally to hybrid modules and more specifically to hydraulic and controls in hybrid modules.

BACKGROUND

Hybrid modules including torque converters and used with automatic transmission use transmission hydraulics to actuate a connect/disconnect clutch of the hybrid module.

SUMMARY OF THE INVENTION

A hybrid module is configured for arrangement in the torque path upstream from a transmission and downstream from an internal combustion engine is provided. The hybrid module includes a housing, an electric motor including a stator non-rotatably fixed to the housing and a rotor rotatable within the stator, a shaft configured for non-rotatably connecting to a crankshaft of an internal combustion engine and a clutch having a clutch output non-rotatably fixed to the rotor. The clutch is configured for being actuated between an engaged orientation for drivingly connecting the shaft to the clutch output and a disengaged orientation for drivingly disconnecting the shaft from the clutch output. The hybrid module also includes an actuator fixed to the housing. The actuator is configured for hydraulically actuating the clutch between the engaged orientation and the disengaged orientation.

A method of forming a hybrid module configured for arrangement in the torque path upstream from a transmission and downstream from an internal combustion engine is also provided. The method includes providing an electric motor including a stator non-rotatably fixed to the housing and a rotor rotatable within the stator and providing a clutch inside the rotor on a shaft configured for non-rotatably connecting to a crankshaft of an internal combustion engine. The clutch has a clutch output non-rotatably fixed to the rotor and is configured for being actuated between an engaged orientation for drivingly connecting the shaft to the clutch output and a disengaged orientation for drivingly disconnecting the shaft from the clutch output. The method also includes fixing a housing to the stator, the housing including an actuator configured for hydraulically actuating the clutch between the engaged orientation and the disengaged orientation.

BRIEF DESCRIPTION OF THE DRAWINGS

The present disclosure is described below by reference to the following drawings, in which:

FIGS. 1a to 1c show views of a hybrid module in accordance with an embodiment of the present disclosure;

FIGS. 2a to 2c show views of a hybrid module in accordance with another embodiment of the present disclosure;

DETAILED DESCRIPTION

The present disclosure provides a self-contained hybrid module including an electronic pump actuator to actuate the connect/disconnect clutch of the hybrid module. Integrating the electronic pump actuator allows the connect/disconnect clutch to be actuated without using transmission hydraulics, which conventionally involves modifying the transmission both structurally and functionally to perform actuating of the connect/disconnect clutch. Hybrid modules of the present disclosure provide a truly modular hybrid unit which can operate completely independently of the transmission. A fully integrated hybrid module including hydraulic power for actuating clutches and motor cooling may provide a significant advantage to automobile manufacturers, by eliminating the modification and re-routing of hydraulic passages in the transmission. The present disclosure integrates a system of pump(s), accumulators and control valve (s) into a hybrid module to make the hybrid modules self contained units.

Figure 1A:
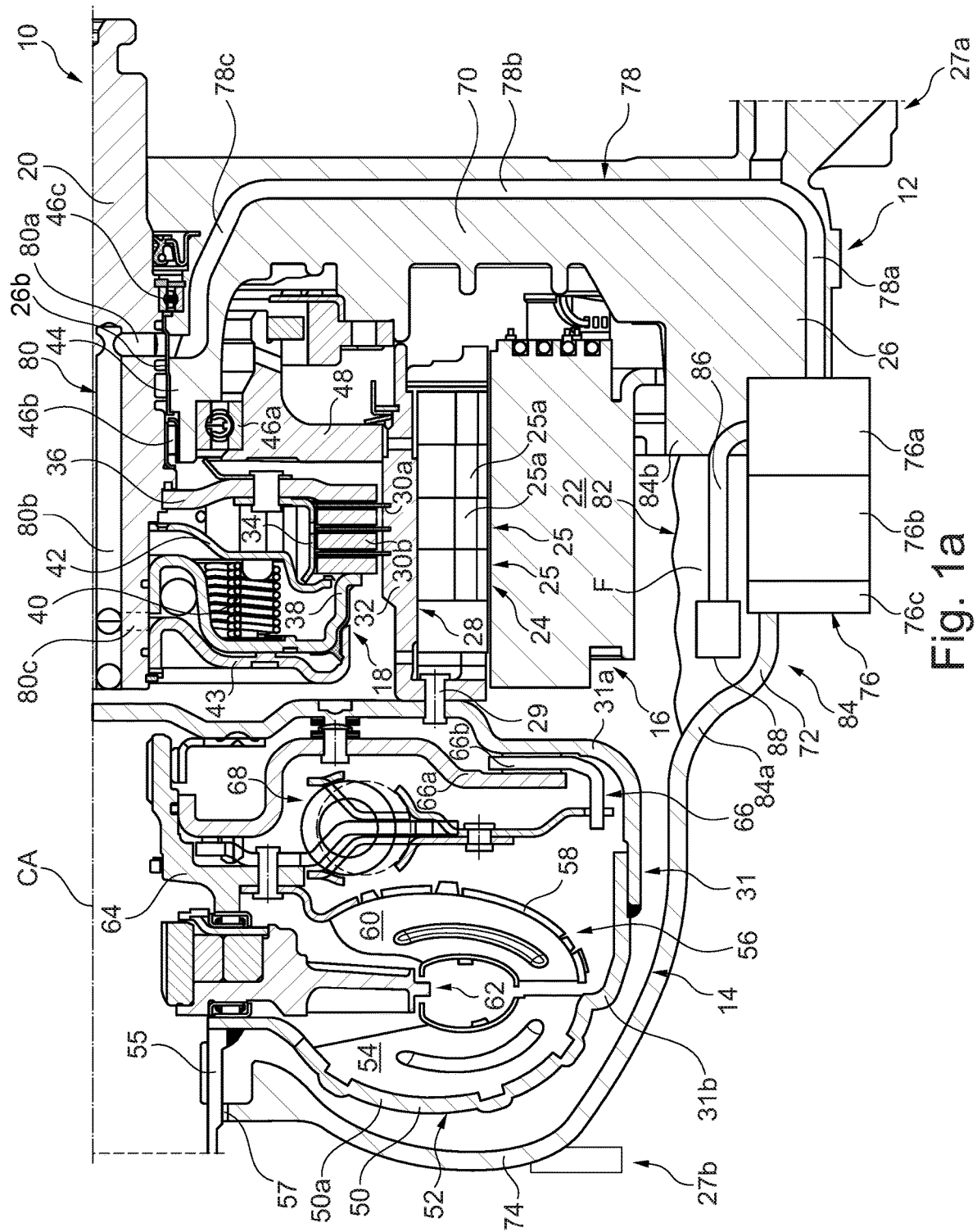

FIG. 1a shows a radial cross-sectional view of a hybrid module 10 in accordance with an embodiment of the present disclosure. Module 10 includes a hybrid drive unit 12 configured for attachment to an internal combustion engine and a torque converter 14 configured for attachment to a transmission input shaft. In a known manner, hybrid drive unit 12 is selectively operable to transmit torque from the internal combustion engine to torque converter 14 or directly drive torque converter 14 via an electric motor 16 of drive unit 12. Along these lines, hybrid drive unit 12 includes an engine connect/disconnect clutch 18 for selectively connecting torque converter 14 to a connect/disconnect shaft 20, which is configured for non-rotatably connecting for example via a flywheel to a crankshaft of the internal combustion engine, or disconnecting torque converter 14 from shaft 20 such that torque converter can be driven solely by electric motor 16.

Electric motor 16 includes a stator 22 and a rotor 24, with stator 22 being non-rotatably fixed to a housing 26 of hybrid module 10. Upon current being provided to coils of stator 22, rotor 24 is rotated about a center axis CA of hybrid module 10, due to rotor 24 including a plurality of annular rotor segments 25 that each include a plurality of circumferentially space magnets 25a, which in at least some preferred embodiments are permanent magnets, that are energized by the current in the coils. The terms axially, radially and circumferentially as used herein are used with respect to center axis CA. Rotor 24 is non-rotatably fixed at its inner circumferential surface 24a to a rotor carrier 28, which has a cylindrical shape, such that rotor 24 and rotor carrier 28 rotate together about center axis CA Clutch 18 includes a plurality of clutch plates, at least some of which are supported in an axially slidable manner at outer diameter ends thereof by splines 32 formed on an inner circumferential surface of rotor carrier 28. More specifically, the clutch plates include outer splined clutch plates 30a that include outer splines received between splines 32 so plates 30a are supported in an axially slidable manner at the diameter thereof. The clutch plates also include inner splined clutch plates 30b that include inner splines so plates 30b are supported in an axially slidable manner at the diameter thereof by an inner support 34 that is fixed to a counter pressure plate 36, which is nonrotatably fixed to shaft 20. Clutch 18 further includes a piston 38 that is axially slidable along an outer circumference of shaft 20 to engage and disengage clutch 18 based on fluid pressure differences on front and rear sides of piston 38. When piston 38 forces clutch plates clutch plates 30a, 30b against counter pressure plate 36, clutch 18 is engaged and torque from shaft 20 is transmitted through clutch plates 30a, 30b into rotor carrier 28, which then transmits the received torque to damper assembly 14. Piston 38 is held axially away from clutch plates 30a, 30b by a spring 40 supported by a support plate 42. Piston 38 is also resiliently connected to a liftoff control plate 43 that limits the liftoff of piston 38 with respect to clutch plates 30a, 30b. Accordingly, clutch 18 has a clutch output in the form of clutch plates 30a non-rotatably fixed to rotor 24 via rotor carrier 28 and clutch 18 is configured for being actuated between an engaged orientation for drivingly connecting shaft 20 to the clutch output and a disengaged orientation for drivingly disconnecting shaft 20 from the clutch output Housing 26 includes an axially extending annular protrusion 44 provided on an engine side of clutch 18 radially outside of shaft 20. Protrusion 44 supports a ball bearing 46a, which rotatably supports a rotor flange 48 on protrusion 44. An inner race of ball bearing 46a sits on an outer circumferential surface of protrusion 44 and rotor flange 48 extends from an outer circumferential surface of the outer race of ball bearing 46a to rotor carrier 28. An inner circumferential surface of protrusion 44 also supports bearings 46b, 46c that rotatably support shaft 20.

Torque converter 14 includes a front cover 31a and a rear cover 31b together forming cover 31, with fasteners 29 passing axially through a radially extending section of front cover 31a, which extends radially inward to intersect center axis CA, and through a radially extending portion of rotor carrier 28 to fix cover 31 to rotor carrier 28. Rear cover 31b forms an impeller shell 50 of an impeller 52 that includes a plurality of impeller blades 54, which are supported by a rounded blade supporting portion 50a of impeller shell 50, which is shaped as an annular bowl and contacts rear edges of impeller blades 54. A cylindrical impeller hub 55 is non-rotatably fixed to a radially inner end of impeller shell 50 and protrudes axially away from the radially inner end of impeller shell 50 toward the transmission.

Torque converter 14 also includes a turbine 56 including a turbine shell 58 supporting a plurality of turbine blades 60. Torque converter 14 also includes a stator 62 axially between turbine 56 and impeller 52 to redirect fluid flowing from the turbine blades 60 before the fluid reaches impeller blades 54 to increase the efficiency of torque converter 14. Radially inside of turbine blades 60, turbine shell 58 is fixed to an output hub 64 of torque converter 14. Output hub 64 includes a splined inner circumferential surface for non-rotatably connecting to the outer circumferential surface of the transmission input shaft.

Torque converter 14 further includes a lockup clutch 66 formed by a piston 66a and a clutch plate 66b, with the piston 66a being configured for pressing a clutch plate 66b against and interior radially extending surface of front cover 31a. A damper assembly 68 is fixed to an output section of clutch plate 66b such that damper assembly 68 is configured for receiving torque from front cover 31a via lockup clutch 66 when the lockup clutch 66 is in an engaged orientation and transferring torque to the transmission input shaft via output hub 64, which includes a splined inner circumferential surface for non-rotatably connecting to the outer circumferential surface of the transmission input shaft.

Torque converter 14 receives torque input from hybrid drive unit 12 through fasteners 29 at front cover 31a, which is transmitted to impeller 52. When the lockup clutch 66 is in a disengaged orientation, torque is transmitted from cover 31 through turbine 56 by impeller 52 driving turbine 56 via fluid flow from impeller blades 54 to turbine blades 60, and turbine 56 then drives output hub 64.

Housing 26 includes an engine side radially extending section 70 extending radially outward from shaft 20 and an axially extending outer circumferential section 72 extending radially from section 70 to a transmission side radially extending section 74. Radially extending section 70 is disc shaped and includes a hole extending therethrough at center axis CA, with an end of shaft 20 configured for connecting to the engine crankshaft protruding from section 70. Axially extending section 72 defines an outer circumferential surface of housing 26 and is radially outward from and surrounds stator 22 and torque converter 14, while transmission side radially extending section 74 is positioned on a transmission side of rear cover 31b of torque converter 14. An inner circumference of transmission side radially extending section 74 is positioned directly radially on a bearing 57 sitting on the outer circumferential surface of impeller hub 55. Housing 26 is configured to be non-rotatably fixed in place in the vehicle drive train such that shaft 20 and impeller hub 55 protrude from housing 26 and are rotatable with respect to housing 26. Housing 26 includes a first flange 27a for fixing, via fasteners such as bolts, to a housing of the engine and a second flange 27b for fixing, via fasteners such as bolts, to a housing of the transmission. Flange 27a is provided at a radially outer portion of section 70 and flange 27b is provided at a radially outer portion of section 74. Accordingly, after all parts of hybrid module 10 are assembled together, hybrid module 10 is first fixed to the transmission via fasteners at flange 27b and then fixed to the engine via fasteners at flange 27a.

In order to actuate clutch 18, hybrid module 10 further includes an electronic pump actuator 76 fixed to a bottom 26a of housing 26. FIG. 1b schematically shows an axial cross-sectional view of hybrid module 10 and FIG. 1c shows a schematic diagram of the hydraulic system for actuating clutch 18. Electronic pump actuator 76 is fixed to the bottom of axially extending section 72 radially outside of stator 22. In some embodiments, actuator 76 may be bolted to the bottom of housing 26 or integrated inside of housing 26. Housing 26 is provided with a fluid channel 78 extending radially inward from electronic pump actuator 76 to an inner circumferential surface 26b of housing 26. Channel 78 includes a radially outer section 78a extending axially directly from electronic pump actuator 76, an intermediate section 78b extending radially inward from outer section 78b and a radially inner section 78c extending axially from intermediate section 78b into axial protrusion 44 to join inner circumferential surface 26b. Radially inner section 78c is directly aligned with a first radially extending section 80a of a channel 80 formed in shaft 20 such that actuator 76 can pump fluid through channels 78, 80 to actuate clutch 18. Shaft 20 is configured such that channel 80 includes an axially extending section 80b extending axially from first radially extending section 80a to a second radially extending section 80c that extends to the outer circumferential surface of shaft 20 to provide fluid to actuate piston 38 to frictionally engage plates 30a, 30b.

Electronic pump actuator 76 includes a pump 76a, an electric motor 76b and an electronic controller 76c. Motor 76b is controlled by electronic controller 76c to drive pump 76a to pull fluid from a fluid reservoir 82, which is provided radially outside of stator 22. Fluid reservoir 82 is formed by a bottom portion 84 of axially extending section 72 that includes two radially extending walls 84a, 84b axially delimiting reservoir 82. Reservoir 82 is filled with fluid F and the fluid is input into pump 76a from reservoir 82 via a suction line 86 after passing through a filter 88 provided at an inlet of suction line 86. In the some preferred embodiments, actuator 76 is configured such that pump 76a is a controller area network (CAN) controllable pump with controller 76c being configured to receive inputs for controlling motor 76b from the vehicle CAN. Pump 76a may be a variable speed bi-directional pump that can spin forward to pressurize clutch 18 or spin reverse to relieve the pressure in clutch 18. As shown in FIG. 1c, the hydraulic system may include an integrated pressure sensor 90 that feeds back pressure to increase the accuracy of the torque of clutch 18. In some preferred embodiments, pressure sensor 90 is located as close to the clutch 18 as possible. Sensor 90 may also be located at a radially inner of channel section 78b.

As shown in FIG. 1b, housing 26 is provided with a further fluid channel 92 for providing fluid for cooling stator 22. More specifically, channel 92 may extend upwardly from channel 78 to a spray nozzle 94 positioned at a top of housing 26. Spray nozzle 94 may spray fluid directly onto stator 22 during operation to cool stator 22. A pressure reducing valve 96 may be provided to generate a pressure in channel 92 that is below the pressure in channel 78. Accordingly, valve 96 may limit the pressure of the fluid provided to nozzle 94 below a predetermined value. For example, when the pressure needed to actuate clutch 18 is above the predetermined value, valve 96 is active and limits the flow of fluid to nozzle 94 via channel 92, but pressure is below the predetermined value, the valve 96 can be fully open, such that fluid flow from actuator 76 to nozzle 94 is not regulated by valve 96. A further channel 97 may also be in fluid communication with actuator 76 via channel 78 for supplying lubricant to bearing in similar manner as channel section 236b discussed with respect to FIG. 3.

In this embodiment shown in FIGS. 1a to 1c, pump 76a is not limited to regular transmission line pressure and can run at significantly higher pressures to reduce flow needed into the clutch and thereby decrease reaction time and increase controllability.

Figure 2A:
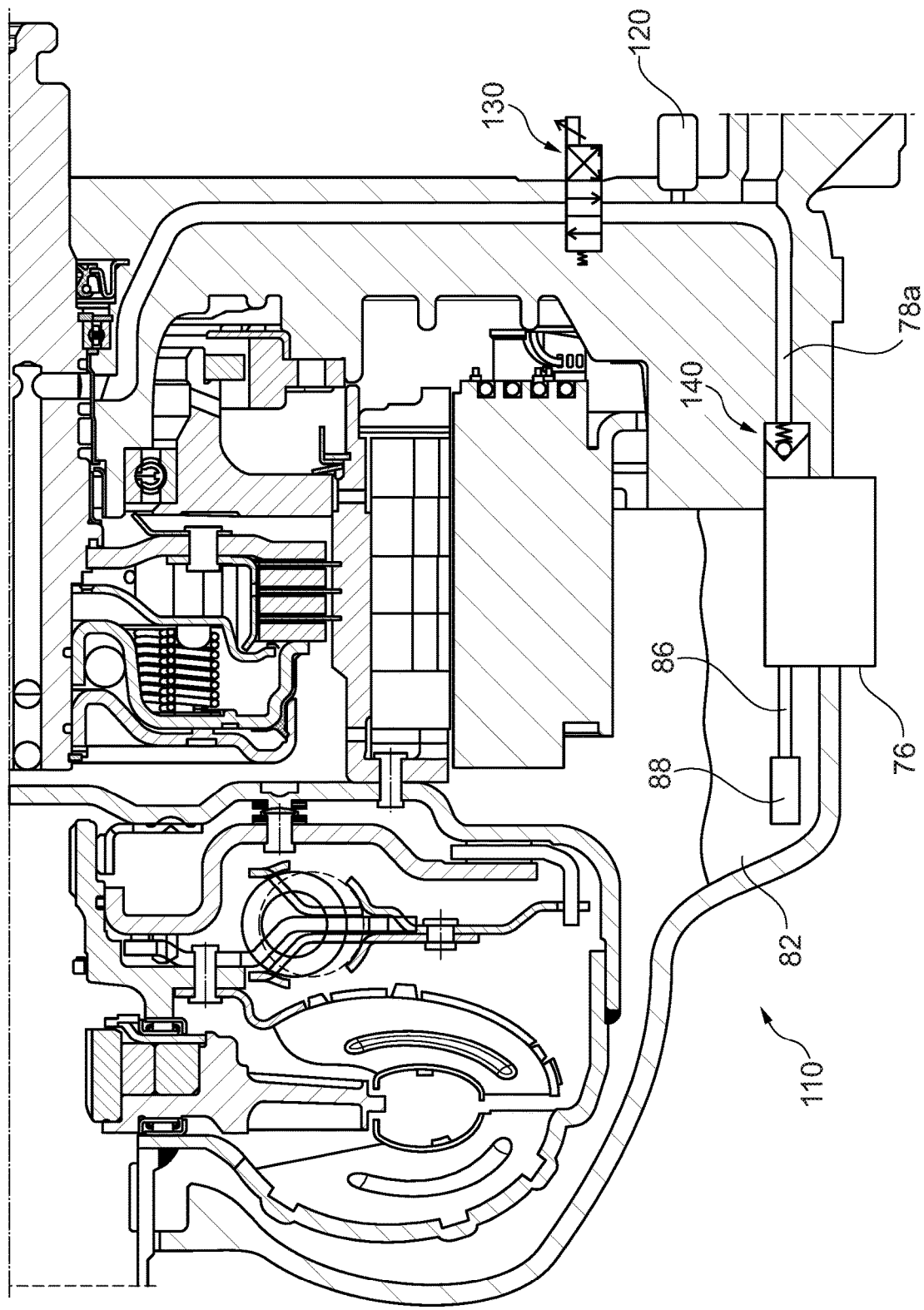

FIGS. 2a to 2c show a hybrid module 110 in accordance with another embodiment of the present disclosure. FIG. 2a shows a radial cross-sectional view of hybrid module 110, FIG. 2b schematically shows an axial cross-sectional view of hybrid module 110 and FIG. 2c shows a schematic diagram of the hydraulic system of module 110 for actuating clutch 18. Hybrid module 110 is configured in the same manner as hybrid module 10, except that the hydraulic system for actuating clutch 18 is different. Along these lines, hybrid module 110 includes the same actuator 76, reservoir 82, suction line 86 and filter 88 as hybrid module 10, but additionally includes an accumulator 120, a directional control valve 130 and a check valve 140. Actuator 76 operates to charge accumulator 120 to store oil at pressure and check valve 140 prevents accumulator 120 from discharging backwards thru channel section 78a into actuator 76. Providing accumulator 120 in this manner reduces power needed from actuator 76, as actuator 76 run to fill the accumulator 120, then the output from actuator 76 is reduced. High pressure oil from the accumulator 120 is then controlled by directional control valve 130. Directional control valve 130 is actuated by a solenoid 132 and controls flow and pressure to clutch 18.

Housing 26 also includes a fluid channel 192 for providing fluid from actuator 76 to outlets for cooling and lubrication of drive unit 12. Fluid channel 192 includes a first section 192a, in which pressure reducing valve 96 is provided, extending from actuator 76, then splits into a second section 192b, which is configured for supplying fluid to lubricate and possibly cool, for example, clutch plates 30a, 30b and bearings 46a, 46b, 46c (FIG. 1a) in drive unit 12, and a third section 192c, which is configured for supplying fluid to nozzle 94 to cool stator 22 (FIG. 1a). A check valve 194 is provided in third section 192c to allow sufficient pressure to be maintained upstream of nozzle 94.

In the embodiment shown in FIGS. 2a to 2c, actuator 76 can be run at lower powers and still have significant oil volume in the accumulator 120 available to actuate the clutch 18 in very short time frames.

Figure 3:
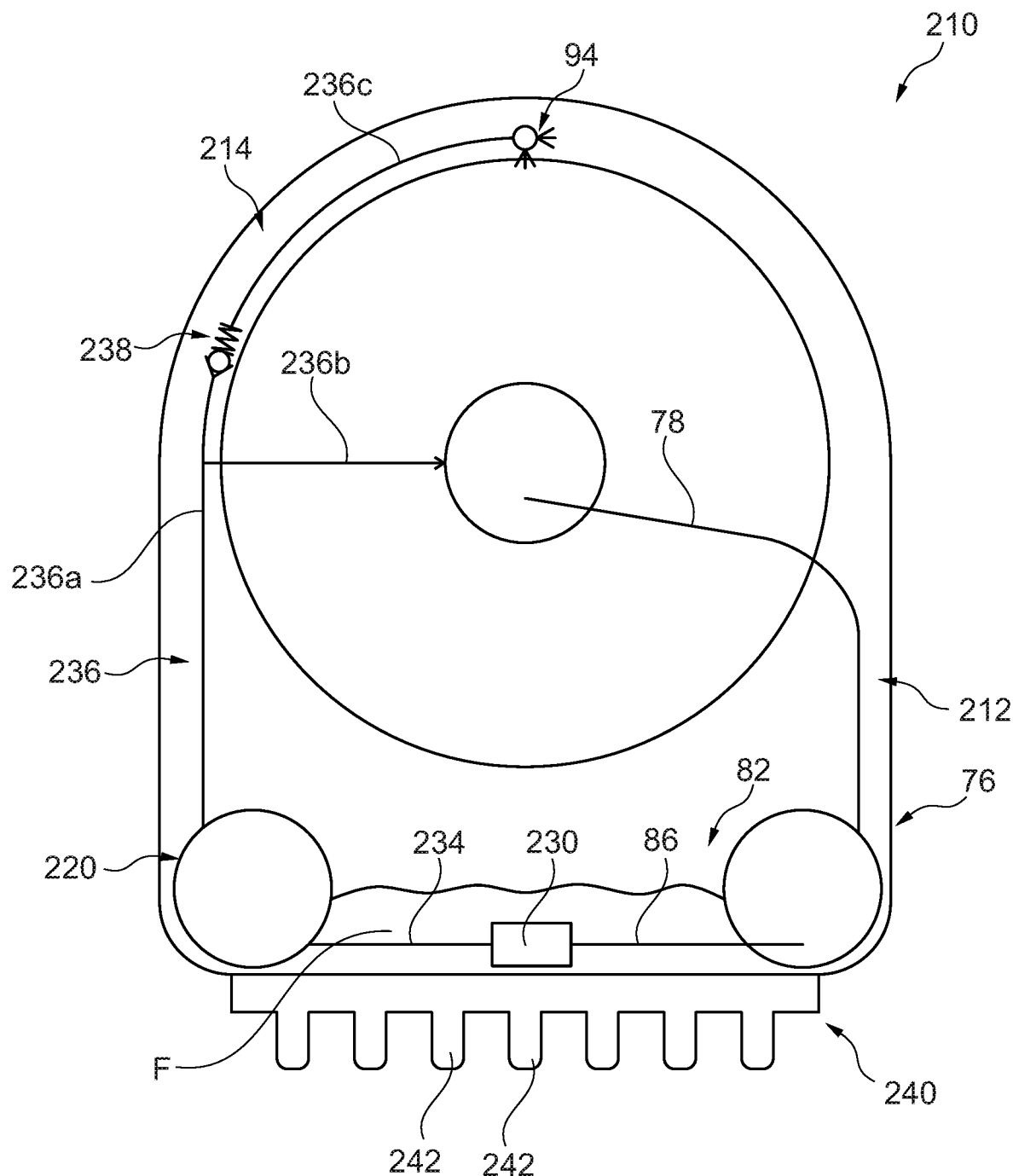
FIG. 3 shows a view of a hybrid module in accordance with another embodiment of the present disclosure.

FIG. 3 schematically shows an axial cross-sectional view of a hybrid module 210 in accordance with another embodiment of the present disclosure. Hybrid module 210 is configured in the same manner as hybrid module 10, except that the hydraulic system for actuating clutch 18 is different. Along these lines, hybrid module 210 includes a second electronic pump actuator 220 in addition to actuator 76. Actuator 76 is provided as part of a clutch actuation circuit 212, which also includes suction line 86 and channel 78, and actuator 210 is provided as part of a lubrication/cooling circuit 214, which also include suction line 234 and fluid channels 92, 92a, that is distinct from the clutch actuation circuit 212. Actuator 76 is configured to supply oil at higher than usual pressures, i.e., in the range of 30 to 50 bars, and relatively lower flow rates, i.e., in the range of 2 to 3 liters per minute, to channel 78 while actuator 220, which also includes an electronic controller, electric motor and pump for control independently of actuator 76, is configured to supply oil at a lower pressure than actuator 76, i.e., in the range of 1 to 2 bars, at higher flow rates, i.e., in the range of 6 to 10 liters per minute, than actuator 76. Both actuators 76, 220 pump fluid from the same reservoir 88. A common filter 230 may be used for both of actuators 76, 220, with fluid passing through filter 230 into first suction line 86 for pumping by actuator 76 and fluid passing through filter 230 into a second suction line 234 for pumping by actuator 220.

Fluid channel 78 for providing fluid from actuator 76 to actuate clutch 18 is distinct and independent from a fluid channel 236 for providing fluid from actuator 220 to outlets for cooling and lubrication of drive unit 12. Fluid channel 236 includes a first section 236a extending from actuator 220, then splits into second section 236b, which is configured for supplying fluid to lubricate and possibly cool, for example, clutch plates 30a, 30b and bearings 46a, 46b, 46c (FIG. 1a) in drive unit 12, and a third section 236c, which is configured for supplying fluid to nozzle 94 to cool stator 22 (FIG. 1a). A check valve 238 is provided in third section 236c to allow sufficient pressure to be maintained upstream of nozzle 94.

Providing separate and independently operating actuators 76, 220 can reduce the overall power demand required to supply fluid to hybrid module 210. In the embodiment shown in FIG. 3, actuator 76 can be sized only for actuating clutch 18 (FIG. 1a) and have no influence of pressure or flow from the lubrication/cooling circuit 214. Actuator 210 can be sized specifically for the low pressure lubrication/cooling circuit 214 and have no influence of pressure or flow from the clutch actuation circuit 212. Actuator 210 can vary the flow rates output by the pump thereof solely based off the cooling and lubrication needs of the module 210.

Figure 5B:
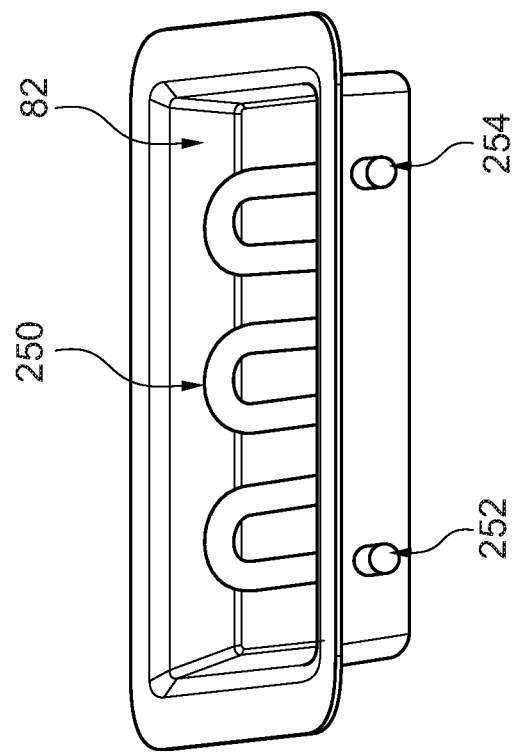
FIGS. 5a and 5b show a fluid cooler in the form of cooling tubes integrated into a bottom of a housing of the hybrid module.
Figure 5A:
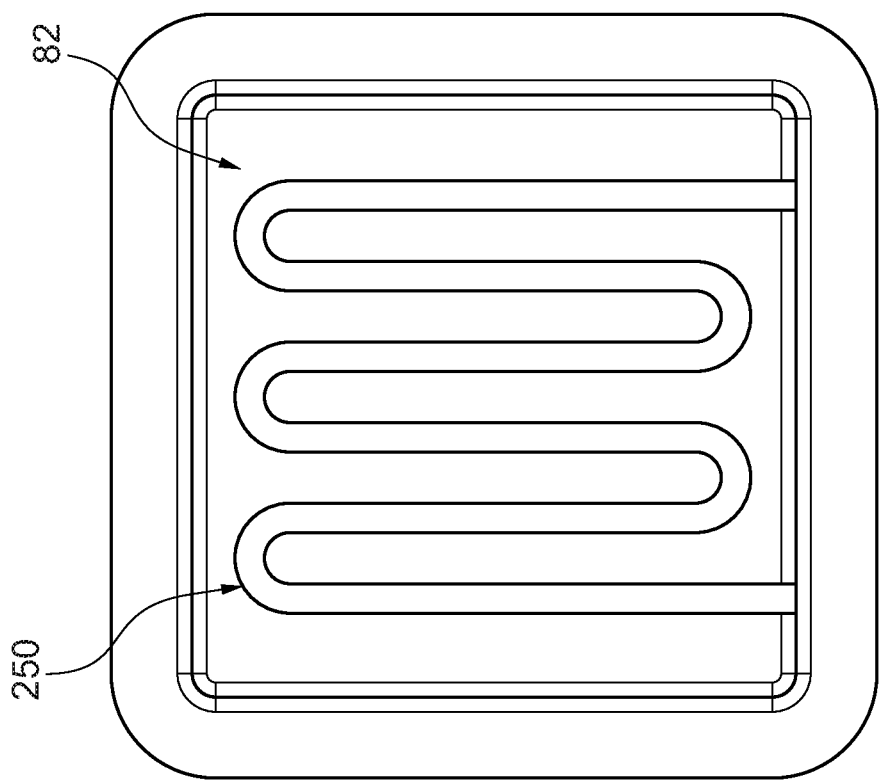

Module 210 further includes a fluid cooler 240 fixed to the bottom of housing 26 in order to cool the fluid F in reservoir 88 formed on the inside of housing 26. In the embodiment shown in FIG. 2, fluid cooler 240 is in the form of an oil to air cooler with external fins 242 extending downward from axially extending outer circumferential section 72 placed in the air flow under the vehicle to the cool the fluid in module 210 independently of the transmission. In alternative embodiments, the fluid cooler may be in the form of cooling tubes 250, shown for example in FIGS. 5a and 5b, integrated into the bottom of housing 26 at section 72 in reservoir 82 and cooling water from the vehicle can be pumped into housing 26 via an inlet 252, through reservoir 82 via the tubes 250 and out of an outlet 254 in housing 26 for increased cooling. In another embodiment, a separate oil to air heat exchanger may be provided, in which the low pressure actuator 220 would pump oil through the heat exchanger and the vehicle supplies cooling water.

Figure 4:
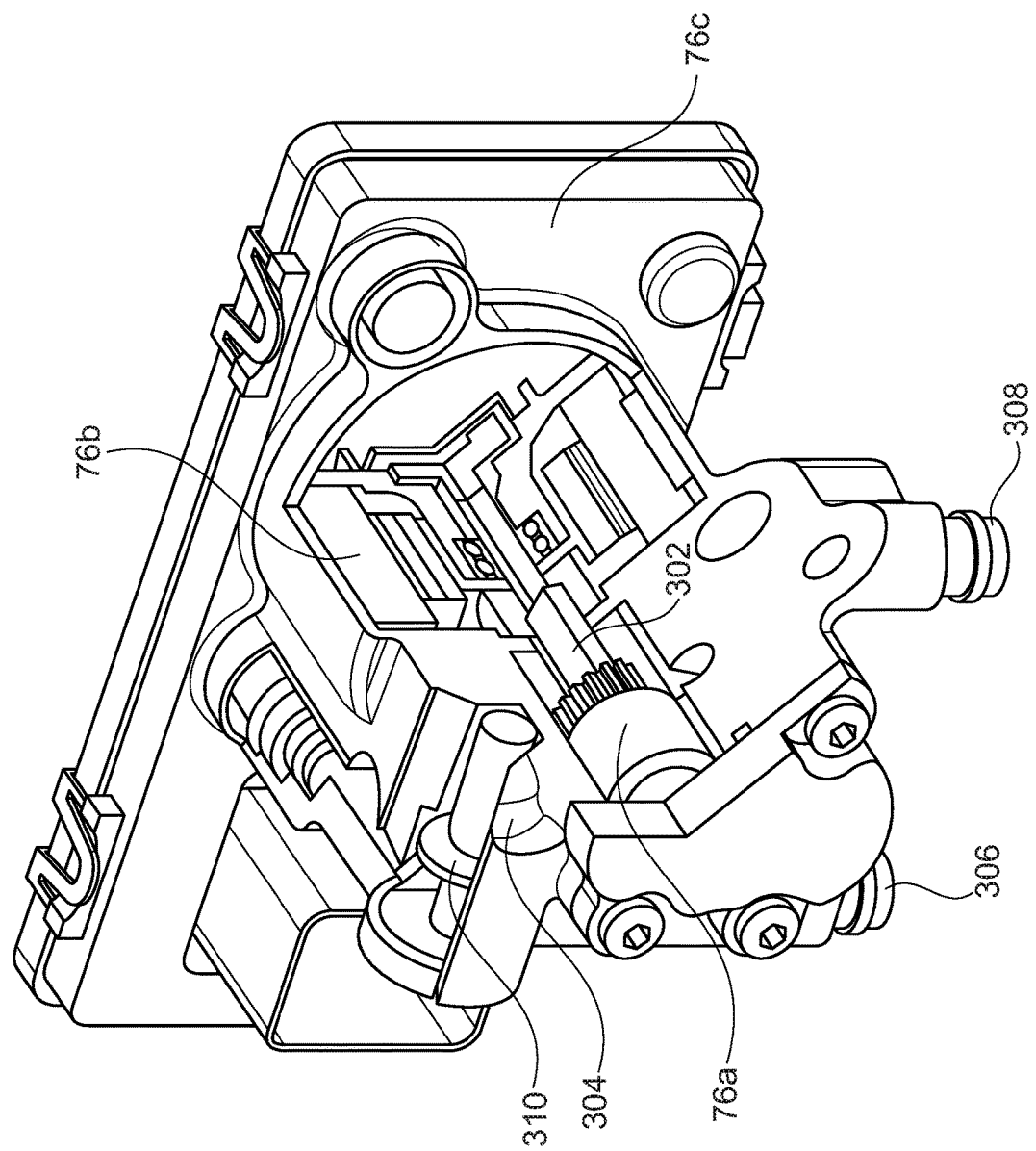
FIG. 4 shows an electronic pump actuator in accordance with an embodiment of the present disclosure.

FIG. 4 shows an embodiment of electronic pump actuator 76. Actuator 220 may be configured in substantially the same manner as actuator 76. Pump 76a is a compensated external gear pump including a shaft 302 driven by motor 76b. Controller 76c can run Code, and based off request over CAN and the pump 76a may spin at near max speed until pressure is reached and then spin very slowly, only fast enough to make up leakage rate and maintain pressure. Actuator 76 includes an inlet port 304 for pumping in fluid from the reservoir and two outlet ports 306, 308 configured for pumping fluid to the fluid channels. A two-pressure logic valve 310 is included in inlet port 304.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
10 hybrid module
12 hybrid drive unit
14 torque converter
16 electric motor
18 engine connect/disconnect clutch
20 connect/disconnect shaft
22 stator
24 rotor
24a inner circumferential surface
25 rotor segments
25a magnets
26 housing
26a bottom
27a, 27b housing flanges
28 rotor carrier
29 fasteners
30a outer splined clutch plates
30b inner splined clutch plates
31 cover
31a front cover
31b rear cover
32 splines
34 inner support
36 counter pressure plate
38 piston
40 spring
42 support plate
43 liftoff control plate
44 housing protrusion
46a, 46b, 46c bearings
48 rotor flange
50 impeller shell
50a rounded blade supporting portion
52 impeller
54 impeller blades
55 impeller hub
56 turbine
57 bearing
58 turbine shell
60 turbine blades
62 stator
64 output hub
66 lockup clutch
66a piston
66b clutch plate
68 damper assembly
70 radially extending section
72 axially extending outer circumferential section
74 transmission side radially extending section
76 electronic pump actuator
76a pump
76b electric motor
76c electronic controller
78 housing fluid channel
78a radially outer section
78b intermediate section
78c radially inner section
80 shaft fluid channel
80a first radially extending section
80b axially extending section
80c second radially extending section
82 fluid reservoir
84 bottom portion
86 suction line
88 filter
90 pressure sensor
92 fluid channel
94 spray nozzle
96 pressure reducing valve
97 fluid channel
110 hybrid module
120 accumulator
130 directional control valve
132 solenoid
140 check valve
192 fluid channel
192a, 192b, 192c channel sections
194 check valve
210 hybrid module
212 clutch actuation circuit
214 lubrication/cooling circuit
220 actuator
230 filter
234 suction line
236 fluid channel
236a, 236b, 236c channel sections
238 check valve
240 fluid cooler
242 external fins
250 cooling tubes
252 inlet
254 outlet
302 shaft
304 inlet port
306, 308 outlet ports
310 logic valve

What is claimed is:

1. A hybrid module configured for arrangement in a torque path upstream from a transmission and downstream from an internal combustion engine, the hybrid module comprising:
a housing;
an electric motor including a stator non-rotatably fixed to the housing and a rotor rotatable within the stator;

a shaft configured for non-rotatably connecting to a crankshaft of the internal combustion engine;

a clutch having a clutch output non-rotatably fixed to the rotor, the clutch configured for being actuated between an engaged orientation for drivingly connecting the shaft to the clutch output and a disengaged orientation for drivingly disconnecting the shaft from the clutch output; and an actuator fixed to the housing, the actuator being configured for hydraulically actuating the clutch between the engaged orientation and the disengaged orientation, wherein:

the housing includes:
an engine side radially extending section extending radially outward from the shaft; and
a housing fluid channel extending from the actuator to an inner circumferential surface of the engine side radially extending section;
the shaft includes a shaft fluid channel therein; and
the housing fluid channel is configured to direct fluid from the actuator into the shaft channel.

2. The hybrid module as recited in claim 1 wherein the actuator is an electronic pump actuator including a pump, an actuator electric motor configured for driving the pump and an electronic controller configured for controlling driving of the pump by the actuator electric motor.

3. The hybrid module as recited in claim 1 further comprising a further fluid channel in fluid communication with the actuator, the further fluid channel supplying fluid from the actuator for cooling or lubricating a part of the hybrid module.

4. The hybrid module as recited in claim 3 wherein the part is the stator and the further fluid channel has an outlet radially outside of the stator.

5. The hybrid module as recited in claim 3 further comprising a pressure reducing valve configured to generate a pressure in the further fluid channel that is below a pressure in the housing fluid channel.

6. The hybrid module as recited in claim 1 wherein the actuator is configured to pump fluid from a reservoir integrated into a bottom of the housing.

7. The hybrid module as recited in claim 1 further comprising a second actuator fixed to the housing, the actuator and the second actuator configured to pump fluid from a same reservoir in the housing, the second actuator configured to pump fluid for cooling or lubricating a part of the hybrid module.

8. The hybrid module as recited in claim 1 further comprising a fluid cooler integrated into the housing for cooling fluid in the housing.

9. A hybrid module configured for arrangement in a torque path upstream from a transmission and downstream from an internal combustion engine, the hybrid module comprising:

a housing;
an electric motor including a stator non-rotatably fixed to the housing and a rotor rotatable within the stator;
a shaft configured for non-rotatably connecting to a crankshaft of the internal combustion engine;
a clutch having a clutch output non-rotatably fixed to the rotor, the clutch configured for being actuated between an engaged orientation for drivingly connecting the shaft to the clutch output and a disengaged orientation for drivingly disconnecting the shaft from the clutch output; and
an actuator fixed to the housing, the actuator being configured for hydraulically actuating the clutch between the engaged orientation and the disengaged orientation, wherein:

the housing includes:
an engine side radially extending section extending radially outward from the shaft; and
a housing fluid channel extending from the actuator to an inner circumferential surface of the engine side radially extending section; and
an axially extending section extending axially from the engine side radially extending section;
the axially extending section defines an outer circumferential surface of the housing; and
the actuator is integrated into the axially extending section.

10. The hybrid module as recited in claim 9 further comprising a torque converter including a cover, the rotor being non-rotatably fixed to the cover, the axially extending section being radially outside of the cover.

11. The hybrid module as recited in claim 10 wherein the housing includes a transmission side radially extending section extending radially inward from the axially extending section, the transmission side radially extending section being positioned on a transmission side of the torque converter.

12. The hybrid module as recited in claim 11 wherein the torque converter includes an impeller hub rotatably supported at an inner circumferential surface of the transmission side radially extending section.

13. A hybrid module configured for arrangement in a torque path upstream from a transmission and downstream from an internal combustion engine, the hybrid module comprising:

a housing;
an electric motor including a stator non-rotatably fixed to the housing and a rotor rotatable within the stator;
a shaft configured for non-rotatably connecting to a crankshaft of the internal combustion engine;
a clutch having a clutch output non-rotatably fixed to the rotor, the clutch configured for being actuated between an engaged orientation for drivingly connecting the shaft to the clutch output and a disengaged orientation for drivingly disconnecting the shaft from the clutch output;
an actuator fixed to the housing, the actuator being configured for hydraulically actuating the clutch between the engaged orientation and the disengaged orientation; and
an accumulator arranged for being charged with fluid by the actuator to store the fluid at a pressure; and a check valve arranged to prevent fluid from flowing from the accumulator back into the actuator.

14. The hybrid module as recited in claim 13 further comprising a directional control valve fluidically between the accumulator and the clutch.

15. The hybrid module as recited in claim 7 wherein the part is the stator and/or a bearing of the hybrid module.

* * * * *